(12) United States Patent
Baba et al.

(10) Patent No.: US 8,571,322 B2
(45) Date of Patent: Oct. 29, 2013

(54) IMAGE PROCESSING METHOD, IMAGE PROCESSING APPARATUS, IMAGE PROCESSING SYSTEM AND COMPUTER FOR RECOGNIZING SHAPE CHANGE OF A FACIAL PART

(75) Inventors: Kozo Baba, Fukuoka (JP); Akiyoshi Tafuku, Fukuoka (JP); Hisao Ito, Fukuoka (JP); Jou Tanji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 647 days.

(21) Appl. No.: 12/546,376

(22) Filed: Aug. 24, 2009

(65) Prior Publication Data

US 2009/0310829 A1    Dec. 17, 2009

Related U.S. Application Data

(63) Continuation of application No. PCT/JP2007/058292, filed on Apr. 16, 2007.

(51) Int. Cl.
*G06K 9/00* (2006.01)

(52) U.S. Cl.
USPC .......................................... 382/190; 382/118

(58) Field of Classification Search
USPC ......................................... 382/118, 278, 103
See application file for complete search history.

(56) References Cited

U.S. PATENT DOCUMENTS

| | | | |
|---|---|---|---|
| 6,181,805 B1 | 1/2001 | Koike et al. | |
| 2001/0008561 A1* | 7/2001 | Paul et al. | 382/103 |
| 2003/0059124 A1* | 3/2003 | Center, Jr. | 382/278 |
| 2003/0123713 A1* | 7/2003 | Geng | 382/118 |
| 2003/0215115 A1* | 11/2003 | Kim et al. | 382/118 |

FOREIGN PATENT DOCUMENTS

| | | |
|---|---|---|
| JP | A 7-302327 | 11/1995 |
| JP | A 2005-71344 | 3/2005 |
| JP | A 2005-78311 | 3/2005 |
| JP | A 2006-251926 | 9/2006 |

* cited by examiner

*Primary Examiner* — Hadi Akhavannik
(74) *Attorney, Agent, or Firm* — Greer, Burns & Crain, Ltd.

(57) ABSTRACT

An image processing method for calculating feature amounts of a facial part in a face on the basis of a plurality of image data obtained in chronological order, comparing the calculated feature amounts with a threshold value, and recognizing the facial part, includes: calculating face orientations on the basis of image data; storing, in a storage, the feature amounts calculated from the image data, the feature amounts being associated with the face orientations; and recognizing a facial part in different image data of the face other than the plurality of the image data on the basis of a feature amount calculated from the different image data, the feature amounts stored in the storage associated with the face orientation in the different image data, and a threshold.

9 Claims, 18 Drawing Sheets

FIG. 8A
FIG. 8B
FIG. 8C

FIG. 10A
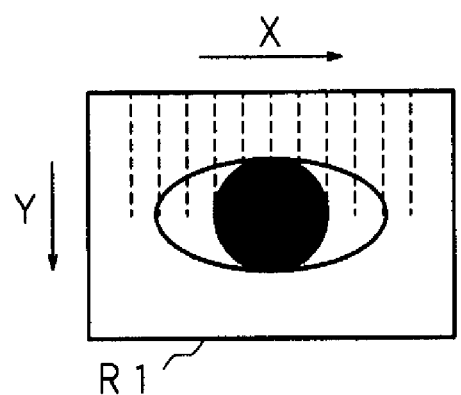
FIG. 10C
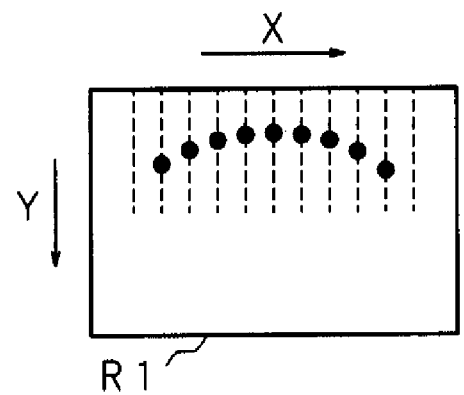
FIG. 10B
3×3 MATRIX
| 1 | 1 | 1 |
|---|---|---|
| 0 | 0 | 0 |
| -1 | -1 | -1 |
FIG. 10D
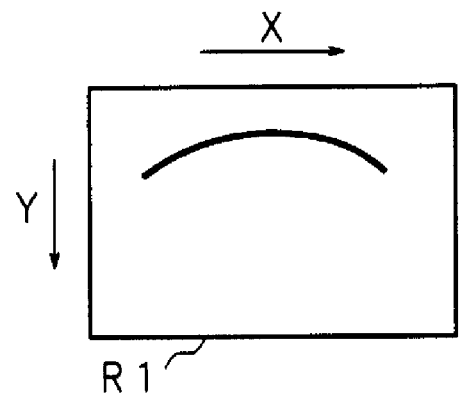

FRONT/FRONT

UP/FRONT     CURVATURE:LARGE
HIGHT:HIGH

FRONT/LEFT2     CURVATURE:SMALL
HIGHT:LOW

FRONT/DOWN     CURVATURE:SMALL
HIGHT:LOW

IMAGE PROCESSING METHOD, IMAGE PROCESSING APPARATUS, IMAGE PROCESSING SYSTEM AND COMPUTER FOR RECOGNIZING SHAPE CHANGE OF A FACIAL PART

This application is a continuation, filed under 35 U.S.C. §111(a), of PCT International Application No. PCT/JP2007/058292 which has an international filing date of Apr. 16, 2007, and designated the United States of America.

FIELD

The embodiment discussed herein relates to: an image processing method for calculating feature amounts of a facial part on the basis of a plurality of pieces of image data obtained in chronological order, and for comparing the calculated feature amounts with a threshold value, thereby recognizing the facial part; an image processing apparatus for carrying out the image processing method; an image processing system including the image processing apparatus; and a computer program for causing a computer to function as the image processing apparatus.

BACKGROUND

A driving status monitoring system for monitoring the driving status of a vehicle such as an automobile has been proposed. The driving status monitoring system includes: an image pickup device capable of taking an image of a driver's face and installed at a suitable place; and an image processing apparatus. The image pickup device takes an image of a driver's face, and the image processing apparatus detects, from image data obtained by taking the image, an eye position of the driver. Then, the image processing apparatus calculates the degree of opening of the eye (hereinafter, called an "opening"), and determines whether the opening is equal to or greater than a given threshold value, thereby recognizing an open/closed state of the eye. The threshold value is decided on the basis of a positional relationship between the installed site of the image pickup device and an object. With the use of the driving status monitoring system, the driver's drowsy driving may be detected, and a system for issuing an alarm to the driver conducting drowsy driving may be configured.

On the other hand, Patent Document 1 discusses that there has been proposed an image processing apparatus configured so that an opening when an upper eyelid is in an upwardly convex state is calculated, and a threshold value is set at a given percentage of the opening, e.g., at 70% of the opening, thus recognizing eye opening/closing.

Patent Document 1 discusses eye opening/closing detection adapting to differences among individuals.

However, the above-described conventional apparatus has a problem that eye recognition accuracy is degraded when an eye opening is changed due to a face orientation. For example, when a driver is facing downward, his or her eye is narrowed, resulting in false recognition of the closed state of the eye.

Further, since features such as shape and size of a facial part are generally changed due to a face orientation, the similar problem occurs even when a facial part other than an eye is recognized.

[Patent Document 1] Japanese Laid-Open Patent Publication No. 2006-251926

SUMMARY

There is provided an image processing method according to an aspect, for calculating feature amounts of a facial part in a face on the basis of a plurality of image data obtained in chronological order, comparing the calculated feature amounts with a threshold value, and recognizing the facial part, the method including: calculating face orientations on the basis of image data; storing, in a storage, the feature amounts calculated from the image data, the feature amounts being associated with the face orientations; and recognizing a facial part in different image data of the face other than the plurality of the image data on the basis of a feature amount calculated from the different image data, the feature amounts stored in the storage associated with the face orientation in the different image data, and a threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8A, FIG. 8B and FIG. 8C are diagrams illustrating examples of a shape template and targets to be detected.

FIG. 10A, FIG. 10B, FIG. 10C and FIG. 10D are diagrams illustrating an example of an upper eyelid shape recognition method.

DESCRIPTION OF EMBODIMENTS

Figure 1:
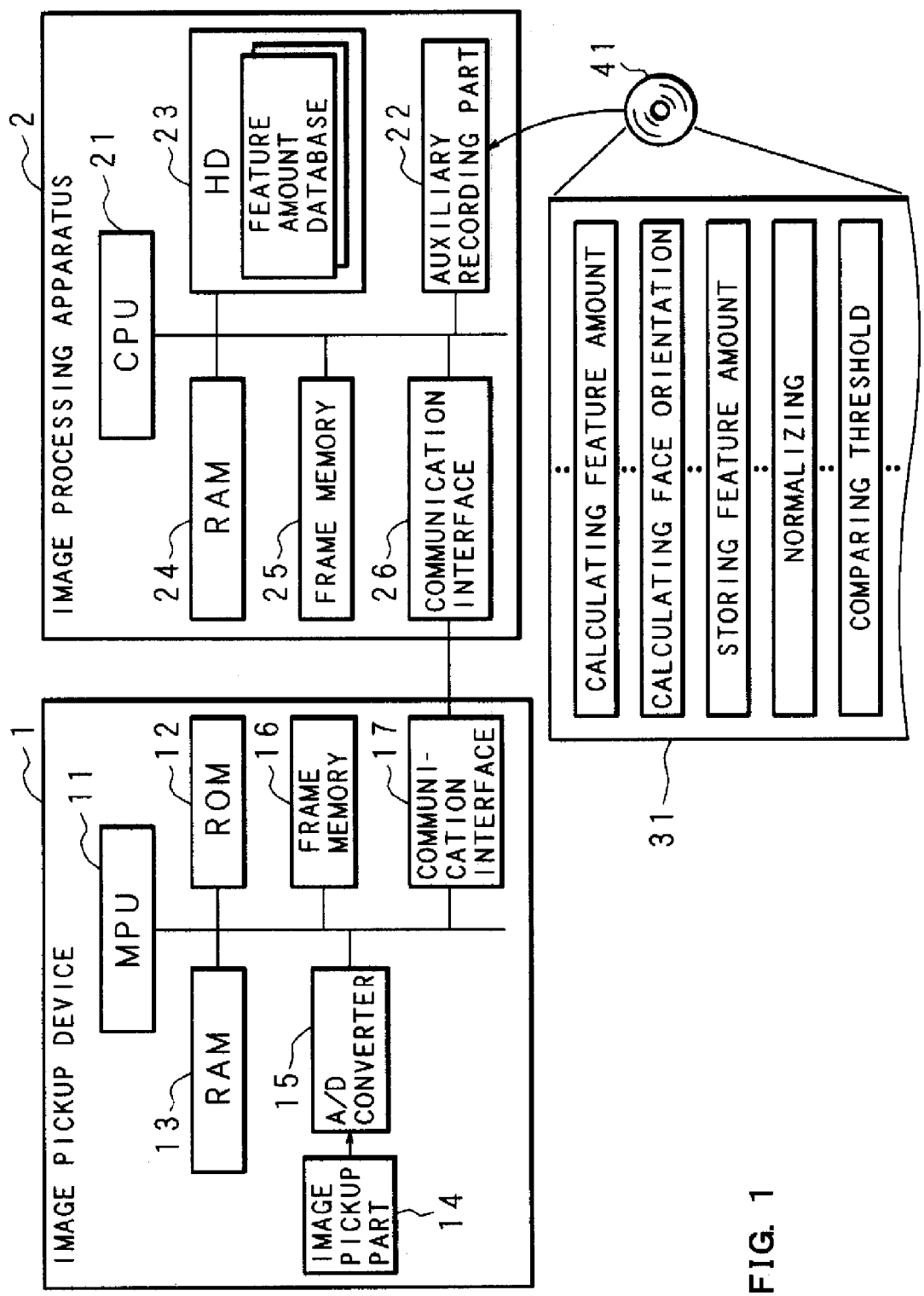
FIG. 1 is a block diagram illustrating an example of a configuration of an image processing system according to one embodiment.

An embodiment will be described in detail with reference to the drawings. In FIG. 1, the reference numeral 1 denotes an image pickup device 1 installed on a vehicle, and the image pickup device 1 is connected, via a communication network, to an image processing apparatus 2 for performing image processing. The communication network is implemented by, for example, a communication line such as a dedicated cable, or a wired or wireless in-vehicle local area network (In-Vehicle LAN).

The image pickup device 1 is disposed at a steering wheel, a dashboard or the like inside the vehicle, located forwardly of a driver, and is adjusted to be in a state in which an image is taken so that the lateral direction and longitudinal direction of the driver's face become the horizontal direction and vertical direction of the image, respectively.

The image pickup device 1 includes: an MPU (Micro Processor Unit) 11 for carrying out control of the entire device; a ROM (Read Only Memory) 12 for recording various computer programs and data executed on the basis of the control carried out by the MPU 11; a RAM (Random Access Memory) 13 for recording various pieces of data temporarily generated at the time of execution of the computer programs recorded in the ROM 12; an image pickup part 14 formed using an image pickup element such as a CCD (Charge Coupled Device); an A/D converter 15 for converting analog image data, obtained by the image taken by the image pickup part 14, to digital data; a frame memory 16 for temporarily recording the image data converted to digital data by the A/D converter 15; and a communication interface 17 used for communication with the image processing apparatus 2.

In the image pickup device 1, the image pickup part 14 performs an image-taking process continuously or intermittently, generates, on the basis of the image-taking process, 30 pieces of image data (image frames) per second, for example, and outputs the generated image data to the A/D converter 15. The A/D converter 15 converts respective pixels, which constitute an image, to digital image data represented with gradation such as 256 level gradation (1 Byte), and allows the frame memory 16 to record the digital image data. The image data recorded in the frame memory 16 is outputted from the communication interface 17 to the image processing apparatus 2 with a given timing.

Respective pixels constituting an image are arranged two-dimensionally, and image data includes positions of respective pixels presented on a plane rectangular coordinate system, i.e., a so-called X-Y coordinate system, and data (brightness values) indicative of the brightness of the respective pixels presented as gradation values. The horizontal direction of an image corresponds to the X-axis direction of image data, while the vertical direction of an image corresponds to the Y-axis direction of image data. It should be noted that instead of presenting coordinates on the basis of an X-Y coordinate system individually for each pixel, coordinates may be presented on the basis of an order in which they are arranged in data. Furthermore, in the embodiment, image processing performed on the basis of gray scale image data will be described. When color image data is used, the similar image processing may be executed on brightness data of respective pixels constituting the image data.

The image processing apparatus 2 is equipped with a computer, and includes: a CPU (Central Processing Unit) 21 for carrying out control of the entire apparatus; a recording medium 41 for recording a computer program 31 concerning the embodiment, various threshold values, and other various pieces of information; an auxiliary recording part 22 for reading information from a CD-ROM or the like, for example; a hard disk (hereinafter, called a "HD") 23 for recording various pieces of information read from the auxiliary recording part 22, and a plurality of feature amount databases or the like each associated with a face orientation; a RAM 24 for recording various pieces of data temporarily generated at the time of execution of the computer program 31 recorded on the HD 23; a frame memory 25 formed by a volatile memory; and a communication interface 26 used for communication with the image pickup device 1.

Hereinafter, when the term "feature amount" is used, it is intended that this term may include a plurality of constituent feature amounts, and that each constituent feature amount may be referred to as "feature amount" again. In other words, when the term "feature amount" is used, it is intended that this term may be used as singular or plural by the context it is used in.

The computer program 31 of the embodiment includes a program for causing at least a computer to execute: a process for calculating a face orientation from image data; a process for storing feature amounts calculated from a plurality of pieces of image data in a such a manner that the feature amounts are associated with the face orientation; a process for determining whether the number of the stored feature amounts associated with the face orientation is equal to or greater than a given number; a process for recognizing, when the number of the stored feature amounts associated with the face orientation in other image data has been determined to be equal to or greater than a given number, a facial part in the other image data on the basis of the feature amount calculated from the other image data, the stored calculation result associated with the face orientation, and the threshold value; and a process for recognizing, when the number of the stored feature amounts has been determined to be less than a given number, a facial part on the basis of the feature amount calculated from the other image data, the stored feature amounts associated with other face orientation different from the face orientation, and the threshold value. Furthermore, on the recording medium 41, the computer program 31 is recorded in a computer-readable manner.

It should be noted that the computer program 31 naturally includes a program distributed via a wired or wireless communication network from an external computer, and the image processing apparatus 2 may acquire the computer program 31 via the communication network and record the program on the HD 23.

Furthermore, the CPU 21 reads various pieces of information such as the computer program 31 and data of the present embodiment from the HD 23 to record the information in the RAM 24, and executes various processing procedures included in the computer program 31, thereby allowing the computer to operate as the image processing apparatus 2 according to the embodiment.

In the image processing apparatus 2, the communication interface 26 receives image data outputted from the image pickup device 1, the received image data is recorded in the frame memory 25, and the image data recorded in the frame memory 25 is read, thereby performing various image processing.

Figure 2:
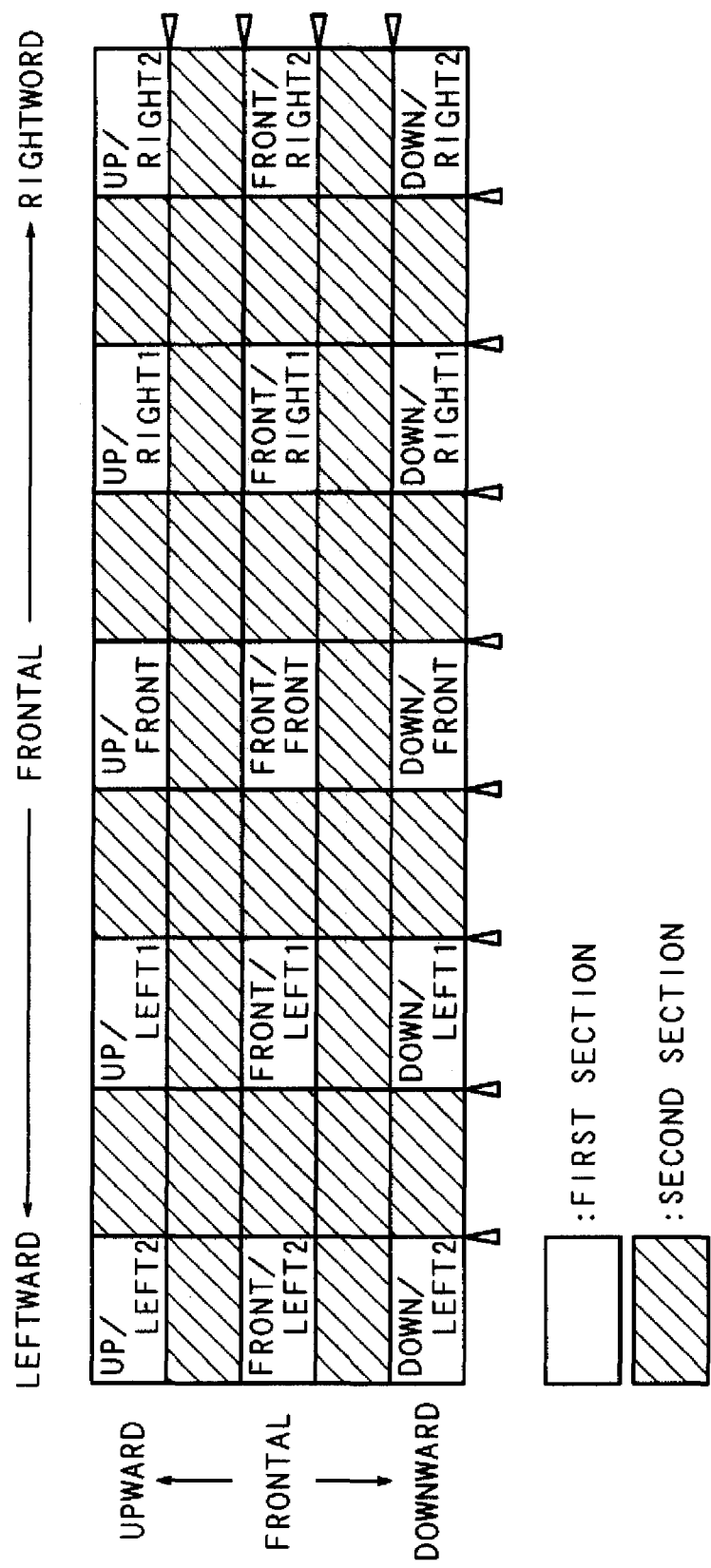
FIG. 2 is a diagram illustrating an example of a plurality of feature amount databases associated with respective face orientations.

In FIG. 2, a plurality of boxes, divided into a 5 by 9 matrix, each correspond to a different face orientation. The lateral arrows each represent the face orientation in the horizontal direction, and the longitudinal arrows each represent the face orientation in the vertical direction. As indicated by "Front/Front", for example, the associated face orientation is presented in each box. The characters "Up", "Front" and "Down", provided on the left hand side of "/" in each box, indicate the face orientations in the vertical direction in three levels. The characters "Left 2", "Left 1", "Front", "Right 1" and "Right 2", provided on the right hand side of "/", indicate the face orientations in the horizontal direction in five levels. It should be noted that for the sake of convenience of description, "Right" and "Left" indicate the right and left of the plane of FIG. 2. Accordingly, the right and left viewed from the driver are opposite to those of FIG. 2. Furthermore, "Left 2" indicates a state in which the driver is facing more leftward than "Left 1" with respect to a frontal orientation. Similarly, "Right 2" indicates a state in which the driver is facing more rightward than "Right 1" with respect to the frontal orientation.

The white boxes in FIG. 2 are arranged so as to be separated by every other box in the horizontal direction and vertical direction from the box "Front/Front" at the center of the matrix, and the HD 23 stores a plurality of feature amount databases, which are associated with the face orientations presented in the respective boxes with one-on-one correspondence. The feature amount databases each serve as a database for accumulating feature amounts of a facial part calculated from image data, or in particular, feature amounts calculated from image data including that of the driver with the associated face orientation. It is preferable to use the feature amounts accumulated for each face orientation, thereby coping with feature amount changes resulting from differences among individuals and face orientations. Hereinafter, each section indicating a face orientation for which a feature amount database is prepared will be referred to as a "first section".

The hatched boxes in FIG. 2 are arranged so as to complement the boxes of the first sections. No feature amount database is associated with the face orientations for the hatched boxes. Hereinafter, a face orientation associated with each box for which no feature amount database is prepared will be referred to as a "second section".

Next, the details of processing of the various devices, used in the image processing system in the embodiment, will be described. The image processing system according to the embodiment copes with feature changes of a facial part resulting from differences among individuals and face orientations, and improves the accuracy of facial part recognition.

Figure 3:
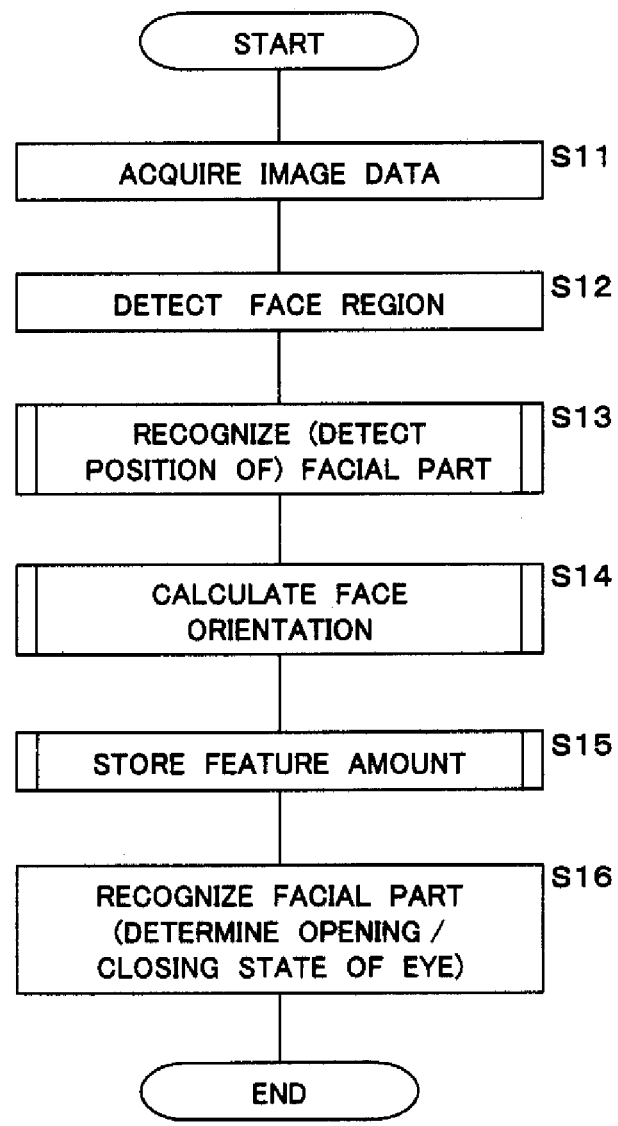
FIG. 3 is an operation chart illustrating a processing procedure of a CPU according to the embodiment.

As illustrated in FIG. 3, the CPU 21 of the image processing apparatus 2 acquires image data recorded in the frame memory 25 (Step S11), and detects, from image data of a face, a face region by a projection operation, threshold value processing or the like (Step S12). Then, the CPU 21 recognizes a facial part from image data of the detected face region (Step S13). Specifically, the CPU 21 calculates, from the image data of the face region, a feature amount of a facial part such as a nose, an eye or an ear. Then, the CPU 21 normalizes the feature amount by using information stored in the feature amount database associated with the face orientation calculated in the previous frame, and compares the normalized standard measure with a threshold value, thereby calculating the position of the facial part.

Subsequently, the CPU 21 calculates a face orientation from the positional relationship of the facial part, or an eye shape or the like (Step S14), and allows the HD 23 to store the calculated face orientation and the feature amount calculated in Step S13 so that the face orientation and feature amount are associated with each other (Step S15). Specifically, the feature amount is stored in the feature amount database associated with the face orientation. Then, the CPU 21 determines an eye open/closed state (Step S16), thus ending the process. In Step S16, an eye opening, calculated from the image data of the present frame, is normalized using information stored in the feature amount database associated with the face orientation calculated in Step S14, and the normalized standard measure is compared with a threshold value, thereby determining the eye open/closed state.

Hereinafter, the processing details described with reference to the flow chart of FIG. 3 will be described more specifically.

Figure 4:
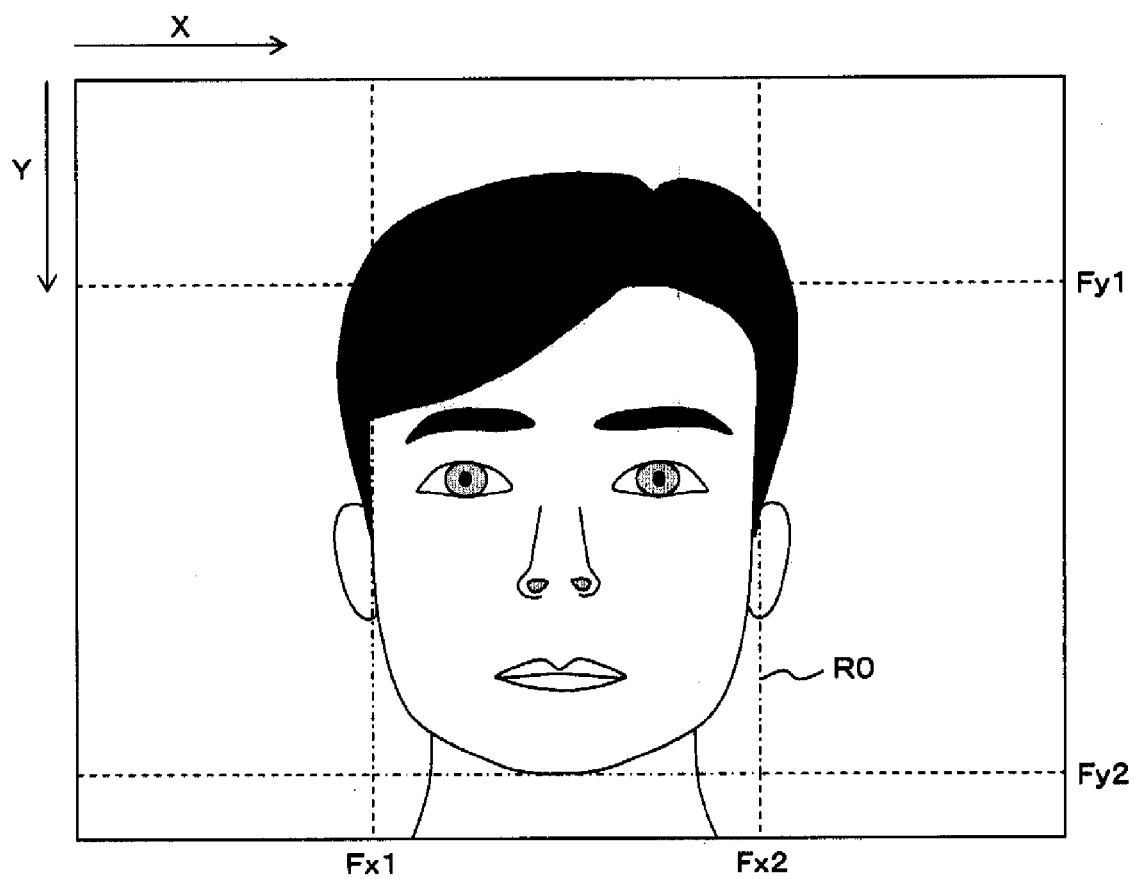
FIG. 4 is a diagram illustrating an example of a face region detection method.

As illustrated in FIG. 4, for each Y coordinate of an image, the CPU 21 in Step S12 integrates brightness values of respective pixels arranged in the horizontal direction, and compares the brightness integrated value obtained by the integration with a given threshold value, thereby detecting the range of a face region R0 in the vertical direction. "Fy1" represents the uppermost Y coordinate of the face region R0 in the vertical direction, and "Fy2" represents the lowermost Y coordinate of the face region R0 in the vertical direction. Since the taken image of the face region R0 is brighter than that of a hair region and that of a background region, the face region R0 is preferably detected by comparing the brightness integrated value with the threshold value.

Similarly, for each X coordinate of the image, the CPU 21 integrates brightness values of respective pixels arranged in the vertical direction, and compares the brightness integrated value obtained by the integration with a given threshold value, thereby detecting the range of the face region R0 in the horizontal direction. "Fx1" represents the left end of the face region R0 in the horizontal direction, and "Fx2" represents the right end of the face region R0 in the horizontal direction. It should be noted that the "left" means the left position viewed from the image pickup device 1, i.e., the left hand side of the plane of FIG. 4, and the "right" means the right hand side of the plane of FIG. 4. Accordingly, the right and left are opposite when viewed from the driver whose image is taken.

Figure 5:
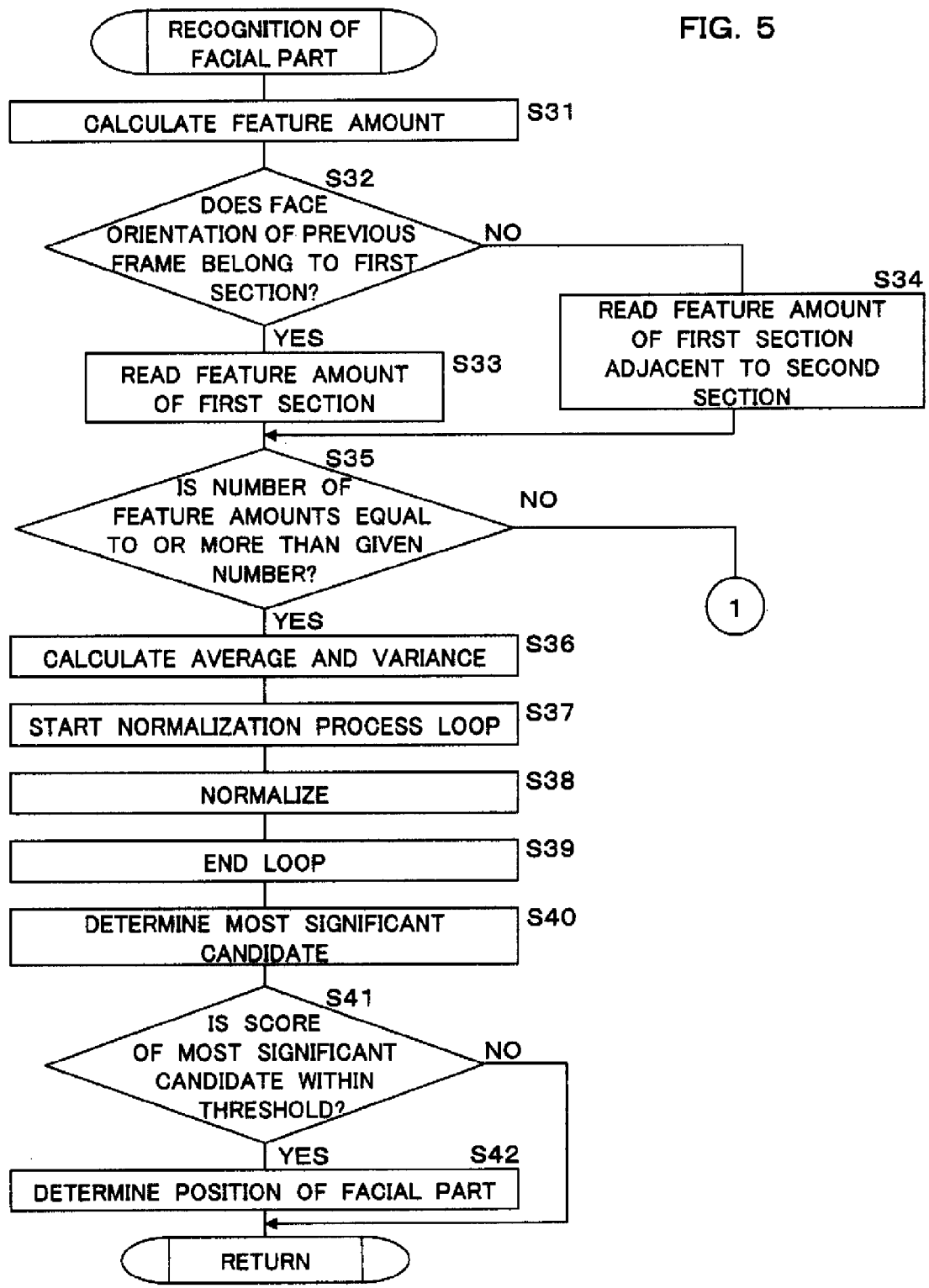
FIG. 5 is an operation chart illustrating a processing procedure of the CPU, concerning facial part recognition.
Figure 6:
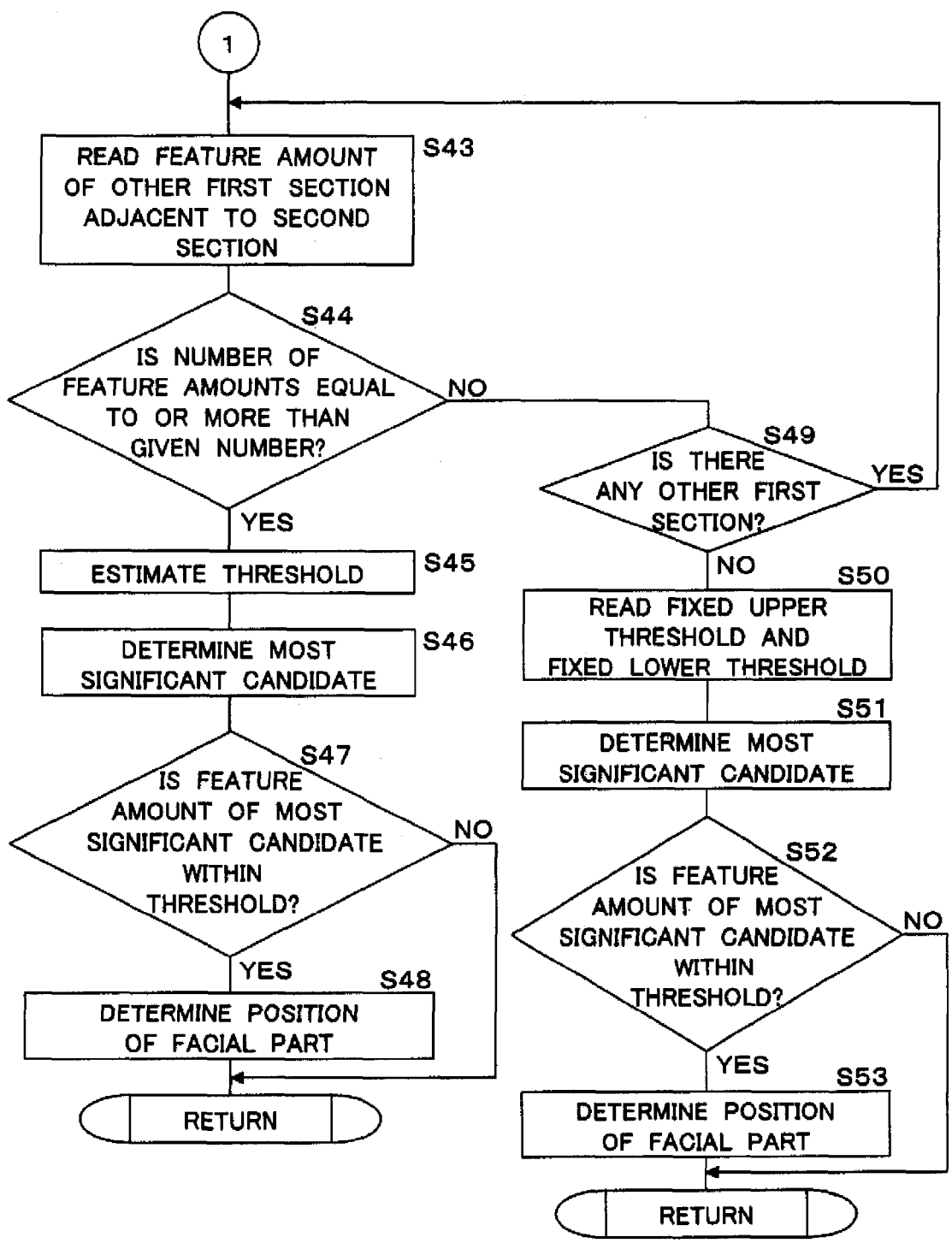
FIG. 6 is an operation chart illustrating a processing procedure of the CPU, concerning the facial part recognition.

As illustrated in FIG. 5 and FIG. 6, the CPU 21 calculates feature amounts of a facial part on the basis of image data (Step S31). For example, an inside/outside brightness difference of an eye, the degree of coincidence (correlation value) between a shape template for detecting an eye and image data, an eye opening, etc. are calculated.

Figure 7A:
FIG. 7A, FIG. 7B and FIG. 7C are diagrams illustrating examples of an inside/outside brightness difference template and targets to be detected.

FIG. 7A illustrates an inside/outside brightness difference template for detecting an eye position. The rectangular frame represents an image region to be subjected to an inside/outside brightness difference operation. The curve bent so that its upper side is formed into a convex shape corresponds to an upper eyelid. The CPU 21 scans the inside/outside brightness difference template from the upper left to the lower right within an eye detection process region, thereby calculating an inside/outside brightness difference. Specifically, the brightness average value of outside of the eye is calculated on the basis of the brightness values of respective pixels constituting an upper-side image portion above the curve, and the brightness average value of inside of the eye is calculated on the basis of the brightness values of respective pixels constituting a lower-side image portion under the curve. Then, the CPU 21 subtracts the brightness average value of inside of the eye from the calculated brightness average value of outside of the eye, thereby calculating the inside/outside brightness difference. Subsequently, from among a plurality of inside/outside brightness differences calculated within the detection process range, the CPU 21 determines, as eye position candidates, a given number of the inside/outside brightness differences from the greater ones, and stores the respective inside/outside brightness differences and coordinate positions thereof.

Figure 7B:
Figure 7C:

FIG. 7B illustrates an eye wearing no makeup, and FIG. 7C illustrates an eye wearing makeup.

The brightness of an upper eyelid portion of the eye illustrated in FIG. 7C is lower than that of an upper eyelid portion of the eye illustrated in FIG. 7B; therefore, the value of the inside/outside brightness difference, calculated from the image data of the eye illustrated in FIG. 7C, is lower than that of the inside/outside brightness difference calculated from the image data of the eye illustrated in FIG. 7B. In other words, the inside/outside brightness differences of the eyes vary depending on differences among individuals. Accordingly, if a process for identifying the position of an eye by making a comparison between a fixed threshold value and an inside/outside brightness difference, the eye might be falsely recognized. Furthermore, even in the case of the same person, the shape of an eye is changed due to the face orientation; therefore, the inside/outside brightness difference is varied, and the eye might be falsely recognized. With the aim of coping with differences among individuals and face orientations, the CPU 21 executes a process described below.

FIG. 8A illustrates a shape template. The curve bent so that its upper side is formed into a convex shape corresponds to an upper eyelid shape. The CPU 21 executes an edge filtering process within an eye detection process region, thereby extracting an upper eyelid edge. Then, the CPU 21 scans the shape template from the upper left to the lower right within the detection process region, calculates the degrees of coincidence between the image of the curve of the shape template and the pixels of the extracted edge, determines, as eye position candidates, a given number of the degrees of coincidence from the greater ones, and stores the respective degrees of coincidence and coordinate positions thereof.

FIG. 8B illustrates unsculptured eyes, and FIG. 8C illustrates sculptured eyes. In the case of the unsculptured eye, an upper eyelid edge is extracted in the form of a curve, and therefore, the degree of coincidence with the shape template is high. However, in the case of the sculptured eye, the edge of an upper eyelid end might not be extracted, and the degree of coincidence with the shape template tends to be low. Also in this case, an eye might be falsely recognized if a comparison is simply made between a fixed threshold value and the degree of coincidence with the shape template as described above.

When the process of Step S31 has been ended, the CPU 21 subsequently determines whether the face orientation in the image data of the previous frame belongs to the first section (Step S32). When the face orientation has been determined as belonging to the first section (when the answer is YES in Step S32), the CPU 21 reads the feature amounts accumulated in the feature amount database associated with the face orientation in the previous frame (Step S33).

Figure 9:
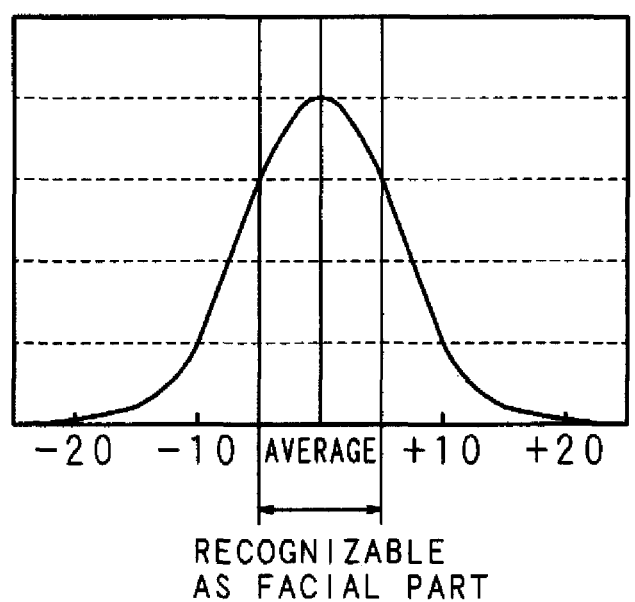
FIG. 9 is a graph illustrating frequency distribution of feature amounts accumulated in feature amount databases.

In FIG. 9, the horizontal axis represents the feature amount value, while the vertical axis represents the number of each feature amount accumulated. The feature amount average value and dispersion value illustrated in FIG. 9 are varied depending on differences among individuals and face orientations, but when the feature amount within the range indicated by both lateral arrows is calculated, the calculation result conceivably has a strong tendency to indicate a driver's facial part. The average value and dispersion value indicate the tendency of feature amount change resulting from differences among individuals and face orientations, and are utilized for a facial part recognition process that copes with the feature amount change.

When the face orientation has been determined as not belonging to any first section (when the answer is NO in Step S32), the CPU 21 reads the feature amounts accumulated in the feature amount databases associated with the first sections adjacent to the second section (Step S34).

For example, when the face orientation is between the section "Front/Front" and the section "Front/Right 1", the CPU 21 reads: the feature amount accumulated in the feature amount database associated with the section "Front/Front"; and the feature amount accumulated in the feature amount database associated with the section "Front/Right 1".

Furthermore, when the face orientation is between the section "Front/Front" and the section "Up/Right 1", the CPU 21 reads: the feature amount accumulated in the feature amount database associated with the section "Front/Front"; the feature amount accumulated in the feature amount database associated with the section "Front/Right 1"; the feature amount accumulated in the feature amount database associated with the section "Up/Front"; and the feature amount accumulated in the feature amount database associated with the section "Up/Right 1".

When the face orientation belonging to the second section is calculated, it is preferable that an average value and a dispersion value are calculated from feature amounts accumulated in a plurality of feature amount databases associated with the adjacent first sections, thereby allowing the average value and dispersion value, serving as criteria for normalization, to avoid face orientation-induced abrupt changes.

When the process of Step S33 or Step S34 has been ended, the CPU 21 determines whether the number of the read feature amounts is equal to or greater than a given number (Step S35). When the number of the read feature amounts is equal to or greater than the given number (when the answer is YES in Step S35), the CPU 21 calculates, on the basis of a plurality of the read feature amounts, the average value and dispersion value of the feature amounts (Step S36). Then, the CPU 21 starts a normalization process loop (Step S37). Subsequently, the CPU 21 calculates a standard measure obtained by normalizing the feature amounts calculated in Step S31 using the average value and dispersion value calculated in Step S36, and determines this standard measure as a score (Step S38).

For example, a standard measure is expressed by the following equation (1) where a represents a feature amount, <a> represents an average value and σ represents a standard deviation. It should be noted that a dispersion value is the square of the standard deviation σ.

$$\text{Standard Measure} = (a - \langle a \rangle)/\sigma \tag{1}$$

It should also be noted that when the face orientation belongs to the second section, the standard measure in the adjacent feature amount database is weighted in accordance with a face orientation angle, thereby calculating a score.

The feature amount average value and dispersion illustrated in FIG. 9 are varied depending on differences among individuals and face orientations, but feature amount normalization may obtain the standard measure with the average value and dispersion value kept constant irrespective of differences among individuals and face orientations. For example, the averages of the inside/outside brightness differences of the eyes illustrated in FIG. 7B and FIG. 7C are about 40 and about 80 with 256 level gradation, respectively, but the standard measures of both of the inside/outside brightness differences become 0 by performing normalization. Accordingly, it is preferable that threshold values are standardized and standardized threshold value determination is performed.

Then, when the normalization process of Step S38 has been performed on all the feature amounts computed in Step S31 by the CPU 21, the control part thereof ends the loop (Step S39). Subsequently, the CPU 21 decides, as the most significant candidate, the standard measure calculated by the normalization or weighting operation, i.e., the score closest to 0 among the scores (Step S40), and determines whether the most significant candidate score falls within a threshold value range (Step S41). In other words, it is determined whether the most significant candidate score is greater than a lower threshold value, and less than an upper threshold value. The HD 23 stores the lower threshold value and upper threshold value in advance. When the most significant candidate score has been determined to be within the threshold value range (when the answer is YES in Step S41), the CPU 21 determines a facial part position (Step S42), thus ending the process concerning facial part recognition. When the most significant candidate score has been determined to be outside the threshold value range (when the answer is NO in Step S41), the CPU 21 determines that facial part detection has failed, and ends the process concerning facial part recognition.

When the number of the feature amounts read in Step 33 or Step S34 has been determined to be less than the given number (when the answer is NO in Step S35), the CPU 21 reads feature amounts from the feature amount databases associated with other adjacent first sections (Step S43). Then, the CPU 21 determines whether the number of the read feature amounts is equal to or greater than a given number (Step S44). When the number of the read feature amounts has been determined to be equal to or greater than the given number (when the answer is YES in Step S44), the CPU 21 estimates a threshold value for identifying a facial part position on the basis of the read feature amounts (Step S45).

Immediately after the start of feature amount accumulation, the frequency of appearance of frontal orientation is high, and therefore, there occurs a situation in which feature amounts are accumulated in the feature amount database associated with the frontal orientation, but feature amounts necessary for normalization are not sufficiently accumulated in the feature amount databases associated with the other face orientations. When the face orientation belonging to the section "Up/Front" has been detected in such a situation, the facial part recognition process that copes with differences among individuals and face orientations cannot be executed.

Therefore, the CPU 21 reads feature amounts from the feature amount database belonging to other adjacent first section, e.g., from the feature amount database belonging to the section "Front/Front", thereby calculating the average value of the feature amounts. Then, an estimated upper threshold value and an estimated lower threshold value for the other face orientation are calculated with respect to the calculated average value.

A certain relationship is established between the feature amount average value for the frontal orientation and the average value for the other face orientation, and therefore, it is preferable that the relationship is stored in advance in the HD 23, thus calculating threshold values responsive to differences among individuals and face orientations.

Subsequently, the CPU 21 decides, as the most significant candidate, the feature amount closest to the threshold value from among the feature amounts computed in Step S31 (Step S46). Then, the CPU 21 determines whether the most significant candidate feature amount falls within the threshold value range (Step S47). In other words, it is determined whether the most significant candidate feature amount is greater than the estimated lower threshold value, and less than the estimated upper threshold value. When the most significant candidate feature amount has been determined to be within the threshold value range (when the answer is YES in Step S47), the CPU 21 determines a facial part position (Step S48), thus ending the process concerning facial part recognition. When the most significant candidate feature amount has been determined to be outside the estimated threshold value range (when the answer is NO in Step S47), the CPU 21 ends the process concerning facial part recognition.

When the number of the feature amounts has been determined to be less than the given number in Step S44 (when the answer is NO in Step S44), the CPU 21 determines whether there is any other first section for which feature amounts are accumulated (Step S49). When it is determined that there is other first section (when the answer is YES in Step S49), the CPU 21 returns the process to Step S43.

When it is determined that there is no other first section (when the answer is NO in Step S49), the CPU 21 reads a fixed upper threshold value and a fixed lower threshold value from the HD 23 (Step S50).

The fixed upper threshold value and fixed lower threshold value are flexible values. This is because since features of a facial part are varied widely from person to person, the facial part is not recognized if the threshold values are strictly set. Even if false recognition of a facial part has occurred in few frames, it is preferable that after the calculated feature amounts have been sufficiently accumulated in the feature amount databases, suitable threshold value determination is performed on the basis of the accumulated feature amounts.

Then, the CPU 21 decides, as the most significant candidate, the feature amount closest to the threshold value from among the feature amounts calculated in Step S31 (Step S51). Then, the CPU 21 determines whether the most significant candidate feature amount falls within the threshold value range (Step S52). In other words, it is determined whether the most significant candidate feature amount is greater than the fixed lower threshold value, and less than the fixed upper threshold value. When the most significant candidate feature amount has been determined to be within the threshold value range (when the answer is YES in Step S52), the CPU 21 determines the position of an eye, which is a facial part (Step S53), thus ending the process concerning facial part recognition. When the most significant candidate feature amount has been determined to be outside the threshold value range (when the answer is NO in Step S52), the CPU 21 ends the process concerning facial part recognition.

Hereinafter, another facial part recognition process will be described. Also when a comparison is made between a feature amount and a threshold value with the aim of recognizing other facial part, it is preferable to cope with changes, resulting from differences among individuals and face orientations, by adopting the foregoing method.

FIG. 10A illustrates an eye region R1 for detection an eye. The eye region R1 is calculated using a relative position with respect to other facial part such as a nostril, for example. As indicated by the broken lines, the CPU 21 executes a filtering process in sequence on respective pixels arranged vertically downward from the upper left portion of the eye region R1, thereby extracting an upper eyelid edge. The CPU 21 also executes the similar edge extraction process in sequence for other vertical lines arranged in the horizontal direction.

As illustrated in FIG. 10B a filter for detecting an upper eyelid is a first order differential filter of a 3×3 matrix for extracting an edge changing from a high-brightness image region to a low-brightness image region from the top toward the bottom in the vertical direction. Factors illustrated in FIG. 10B are numerical values by which the brightness values of the pixels 3×3=9 arranged vertically and horizontally are multiplied, the brightness values of the single pixel (noticeable pixel) at the center and the eight neighboring pixels externally adjacent to the center pixel are each multiplied by the associated one of the factors, and the value obtained by adding the results is calculated as a filter value for the noticeable pixel.

As illustrated in FIG. 10C, the CPU 21 makes reference to the filter values of the respective pixels arranged vertically at the single X coordinate position, thus identifying a maximum filter value. Then, the maximum filter value is normalized in accordance with the face orientation, and the pixel, in which the standard measure of the normalized filter value is equal to or greater than a given threshold value, is detected as the edge extraction point. It should be noted that the given threshold value is a value stored in advance in the HD 23. Similarly, the CPU 21 detects edge extraction points at other X coordinate positions.

Subsequently, the CPU 21 counts the number of the edge extraction points extracted in such a manner, and determines whether the counted number is equal to or greater than a given number stored in advance in the HD 23.

When the number of the extracted edge extraction points is equal to or greater than the given number, the edge extraction points have a strong tendency to indicate an upper eyelid; therefore, on the basis of the coordinate position of each edge extraction point, the CPU 21 calculates a function indicative of the shape of the upper eyelid, and calculates and stores the curvature of the upper eyelid.

As illustrated in FIG. 10D, the CPU 21 approximates the upper eyelid by a quadratic function. More specifically, the upper eyelid may be approximated by $y=\alpha x^2+\beta x+\gamma$, where x represents the X coordinate of an extraction point, y represents the Y coordinate of the extraction point, and $\alpha$, $\beta$ and $\gamma$ each represent a factor for specifying a secondary parabola. Further, each factor is estimated using a maximum likelihood estimation method or the like. In particular, $\alpha$ may indicate how the upper eyelid is curved, and therefore, $\alpha$ is stored as the curvature of the upper eyelid. It should be noted that the curvature does not necessarily have to be the factor $\alpha$ for specifying a quadratic function, but may be a factor such as a curvature, a radius of curvature or other value as long as it is a numerical value by which the shape of the upper eyelid may be evaluated. Alternatively, the shape of the upper eyelid may be evaluated by other approximate curve.

The CPU 21 may also calculate the curvature of a lower eyelid in a similar manner. Further, the height of the eye in the vertical direction may be calculated by calculating the distance between the top of the upper eyelid and that of the lower eyelid. The curvature of the eye and the height of the eye serve as information for calculating an opening indicative of the degree of opening of the eye. For example, the average value of the eye curvature and height is calculated as the opening.

Furthermore, in order to determine the face orientation, the position of a nostril, the CPU 21 recognizes a nostril position, an ear position and the like by following the similar procedure. Hereinafter, an ear position recognition method will be described.

Figure 11A:
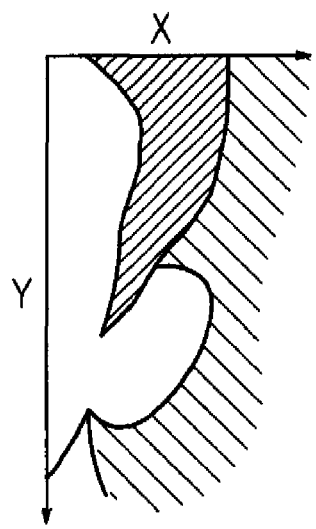
FIG. 11A, FIG. 11B and FIG. 11C are diagrams illustrating an example of an ear position detection method.

FIG. 11A illustrates an image portion located around an ear area. The hatched areas represent dark image regions such as a hair region of a driver and a background region, while the areas that are not hatched represent image regions brighter as compared with the hatched areas.

When a filtering process for extracting the outline of the ear is executed on the image illustrated in FIG. 11A, the filter value of a boundary area or the like between an ear image region and a background image region is calculated as a value greater than the filter value of other image region. The filter for extracting the outline of a right ear (which is a left ear when viewed from the driver) is an oblique edge filter of a 5×5 matrix for extracting an edge changing from a high-brightness image region to a low-brightness image region obliquely toward the lower right, for example.

Figure 11B:
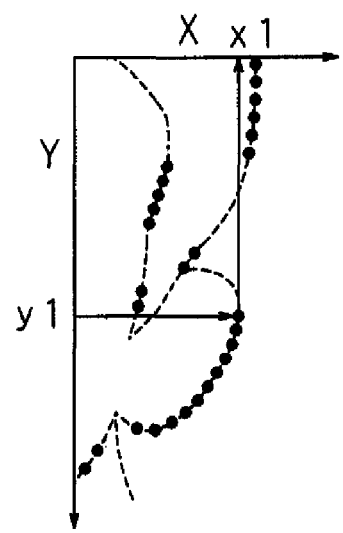

Subsequently, as illustrated in FIG. 11B, the CPU 21 calculates an X coordinate at which the filter value is maximized, among pixels arranged horizontally at each Y coordinate. In FIG. 11B, the broken lines in the diagram are virtual lines indicating the outlines of a face, a neck and a hair area, and pixels indicated by black circles each represent the position coordinate of the pixel having the maximum filter value among the pixels arranged in each horizontal direction.

Then, the CPU 21 stores a Y-direction table in which the respective Y coordinates, the X coordinates with the maximum filter values, and the filter values are associated with each other. Hereinafter, the filter value stored in the Y-direction table will be referred to as an "ear outline candidate filter value".

For example, as illustrated in FIG. 11B, among the pixels, which are arranged horizontally and in which the Y coordinates have y1, the pixel having the maximum filter value is a pixel located at the position indicated by the black circle, and the X coordinate of the pixel is x1. In this case, in the Y-direction table, x1, which is the X coordinate, and the filter value for the coordinates (x1, y1) are stored so as to be associated with the coordinate y1. Also for the other Y coordinates, the similar process will be performed.

Figure 11C:
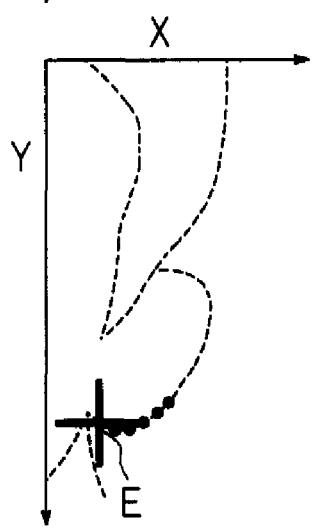

Subsequently, the CPU 21 makes reference to the Y-direction table having information about the ear outline, and detects, on the basis of the shape of the ear, an ear position or in particular an earlobe area position E. As illustrated in FIG. 11C, the earlobe area position E is a position at which the earlobe and face are connected. The earlobe is an area that is most unlikely to be affected by the hairstyle of a driver. Accordingly, by implementing the method so as to detect the ear position, the ear position E may be detected irrespective of the hairstyle of a driver.

Next, a nose position recognition method will be described.

Figure 12:
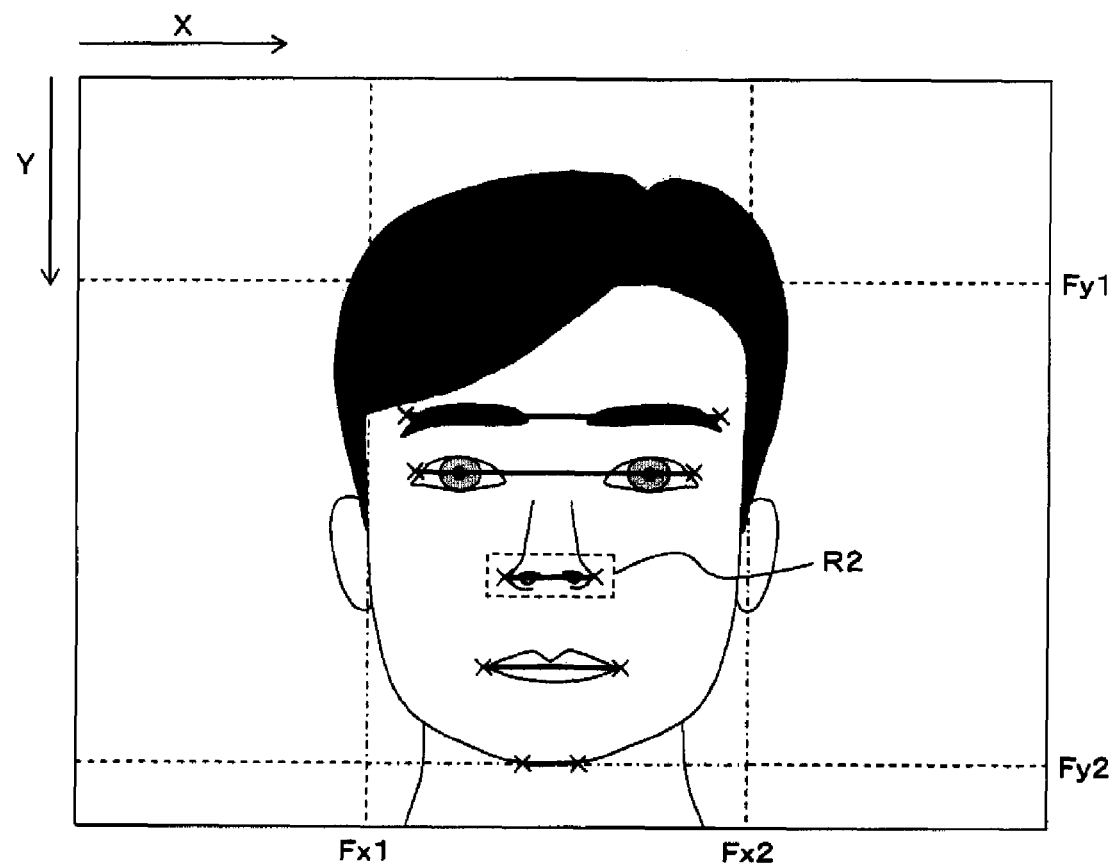
FIG. 12 is a diagram illustrating an example of a nose position detection method.

In FIG. 12, an external rectangular frame indicated by the solid lines represents an overall image, and a rectangular frame, located inside the external rectangular frame and created by the broken lines surrounding a nose, represents a detection process range R2 for detecting the nose.

With the aim of detecting the detection process range R2 for detecting the nose, the CPU 21 integrates brightness values of pixels arranged horizontally, and derives, from the integrated result, a change in the brightness integrated value in the vertical direction. Then, from the derived change in the brightness integrated value in the vertical direction, the CPU 21 detects a plurality of Y coordinate positions each indicative of a minimum value. By performing this process, a plurality of detection target candidates, including eyebrows, eyes, a nose and a mouth each having a low brightness average in the horizontal direction, are detected as illustrated in FIG. 10A, FIG. 10B, FIG. 10C and FIG. 10D. Subsequently, from the change in the brightness values of pixels arranged horizontally at Y coordinates each indicative of the detected minimum values, the CPU 21 detects both ends of the detection target candidates, and detects minimum points in the horizontal direction. In an area surrounding the nose, as indicated by "x" marks, two minimum points corresponding to both ends of wings of the nose and nostrils are detected. On the basis of the ratio between a width Fw of a face region R0 and the length between the both ends of wings of the nose in the horizontal direction, the number of the minimum points, etc., the CPU 21 identifies the range of a process for detecting the periphery of the nose.

Subsequently, from the change in the brightness values of pixels arranged horizontally, the CPU 21 selects the minimum point periphery as a search region, and detects the positions of the nostrils using a black region extraction filter or the like. Furthermore, the coordinates of midpoint of both the nostrils, for example, are used as the nose position for detecting the face orientation.

Figure 13:
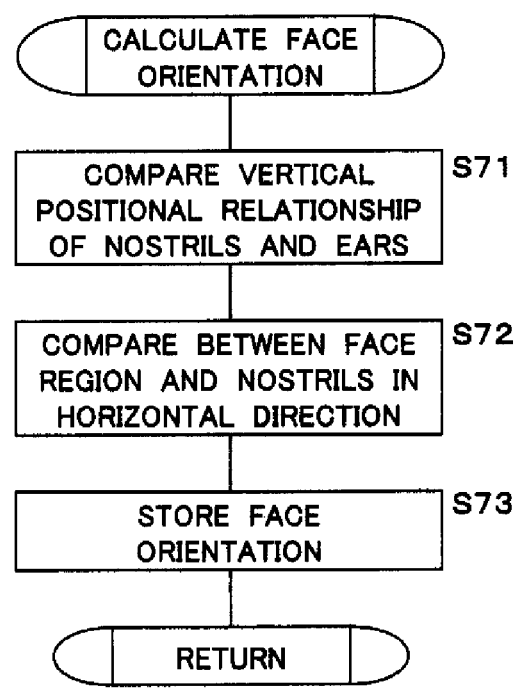
FIG. 13 is an operation chart illustrating a processing procedure of the CPU, concerning face orientation calculation.

As illustrated in FIG. 13, the CPU 21 calculates a vertical face orientation by making a comparison on the vertical positional relationship of nostrils and ears in the vertical direction (Step S71), and calculates a lateral face orientation by making a comparison between the face region R0 and nostril positions in the horizontal direction (Step S72). It is determined that the driver is facing rightward when the nostrils are located to the right of the center of a face width, and it is determined that the driver is facing leftward when the nostrils are located to the left of the center of the face width.

Subsequently, the CPU 21 stores the face orientations calculated in Step S71 and Step S72 (Step S73), thus ending the process concerning face orientation calculation.

Figure 14:
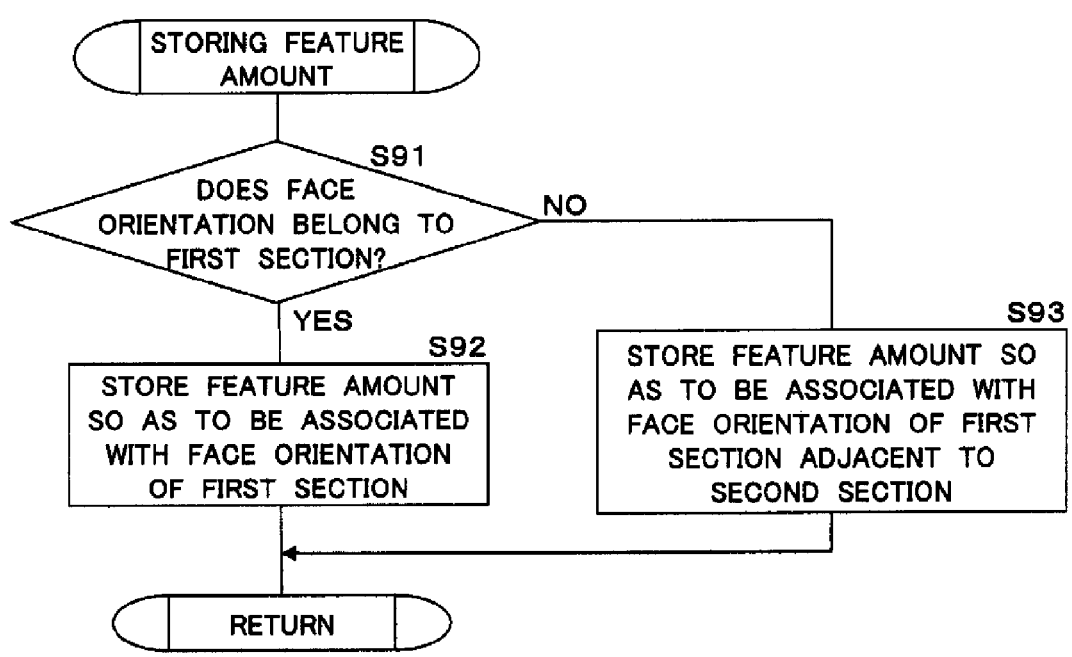
FIG. 14 is an operation chart illustrating a processing procedure of the CPU, concerning feature amount accumulation.

As illustrated in FIG. 14, the CPU 21 determines whether the face orientation calculated by the foregoing process belongs to the first section (Step S91). When the face orientation has been determined as belonging to the first section (when the answer is YES in Step S91), feature amounts are stored in the feature amount database associated with the face orientation (Step S92), thus ending the process concerning feature amount accumulation. For example, the inside/outside brightness difference of the eye, the degree of coincidence with the shape template, the eye curvature, the eye height, etc. are stored.

When the face orientation has been determined as not belonging to any first section (when the answer is NO in Step S91), the CPU 21 stores feature amounts in each of a plurality of feature amount databases associated with the face orientations of the first sections adjacent to the second section (Step S93), thus ending the process concerning feature amount accumulation.

For example, when the face orientation is between the section "Front/Front" and the section "Front/Right 1", the CPU 21 stores feature amounts in each of: the feature amount database associated with the section "Front/Front"; and the feature amount database associated with the section "Front/Right 1".

Furthermore, when the face orientation is between the section "Front/Front" and the section "Up/Right 1", the CPU 21 stores feature amounts in each of: the feature amount database associated with the section "Front/Front"; the feature amount database associated with the section "Front/Right 1"; the feature amount database associated with the section "Up/Front"; and the feature amount database associated with the section "Up/Right 1".

The feature amounts, calculated on the basis of the face orientation belonging to the second section, are each stored in the feature amount databases associated with the adjacent first sections, thereby allowing the average value and dispersion, serving as criteria for normalization, to avoid an abrupt change. In other words, an abrupt change in threshold value may be avoided when the feature amount databases are switched in accordance with the face orientation.

Figure 15:
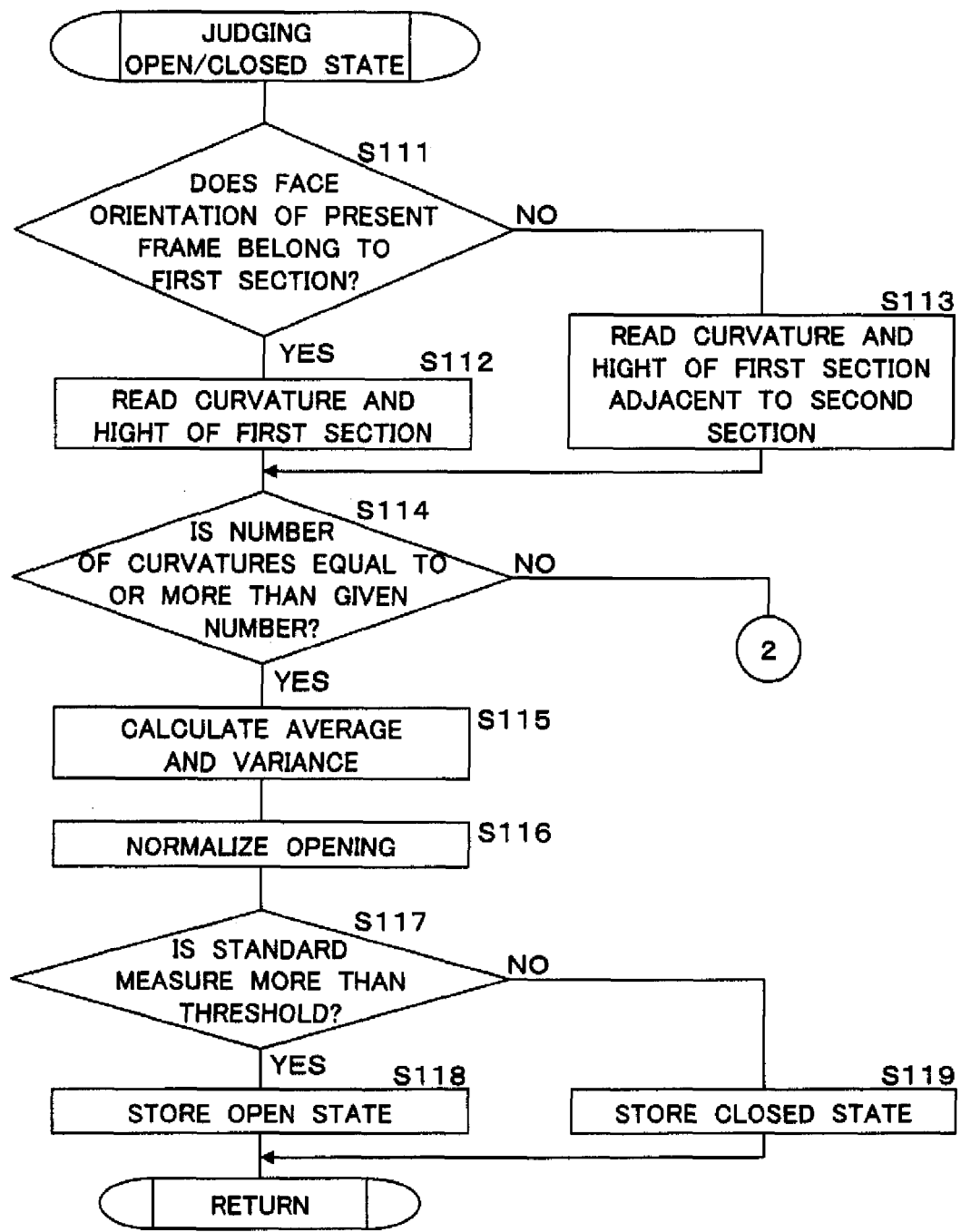
FIG. 15 is an operation chart illustrating a processing procedure of the CPU, concerning open/closed state determination.
Figure 16:
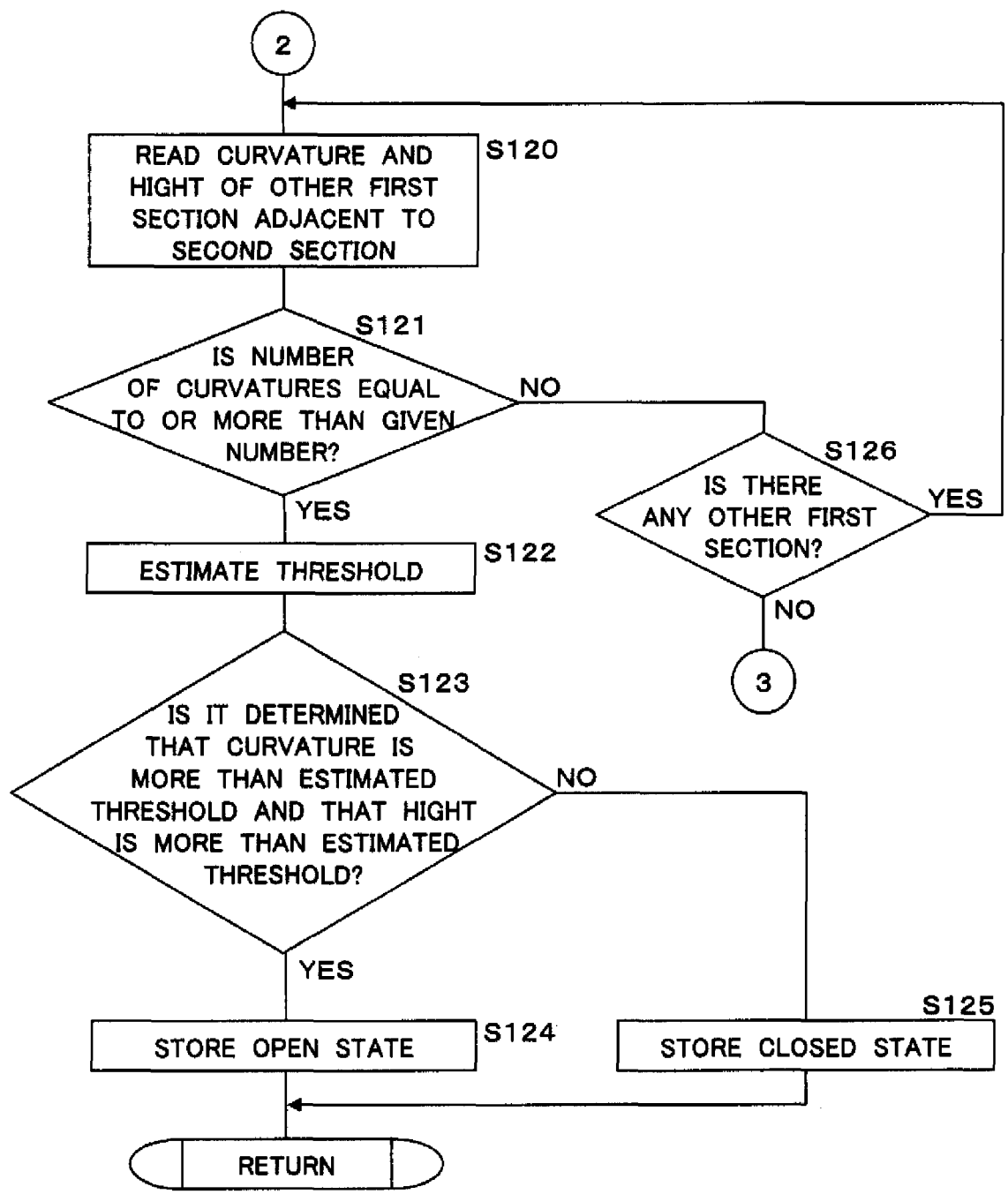
FIG. 16 is an operation chart illustrating a processing procedure of the CPU, concerning the open/closed state determination.
Figure 17:
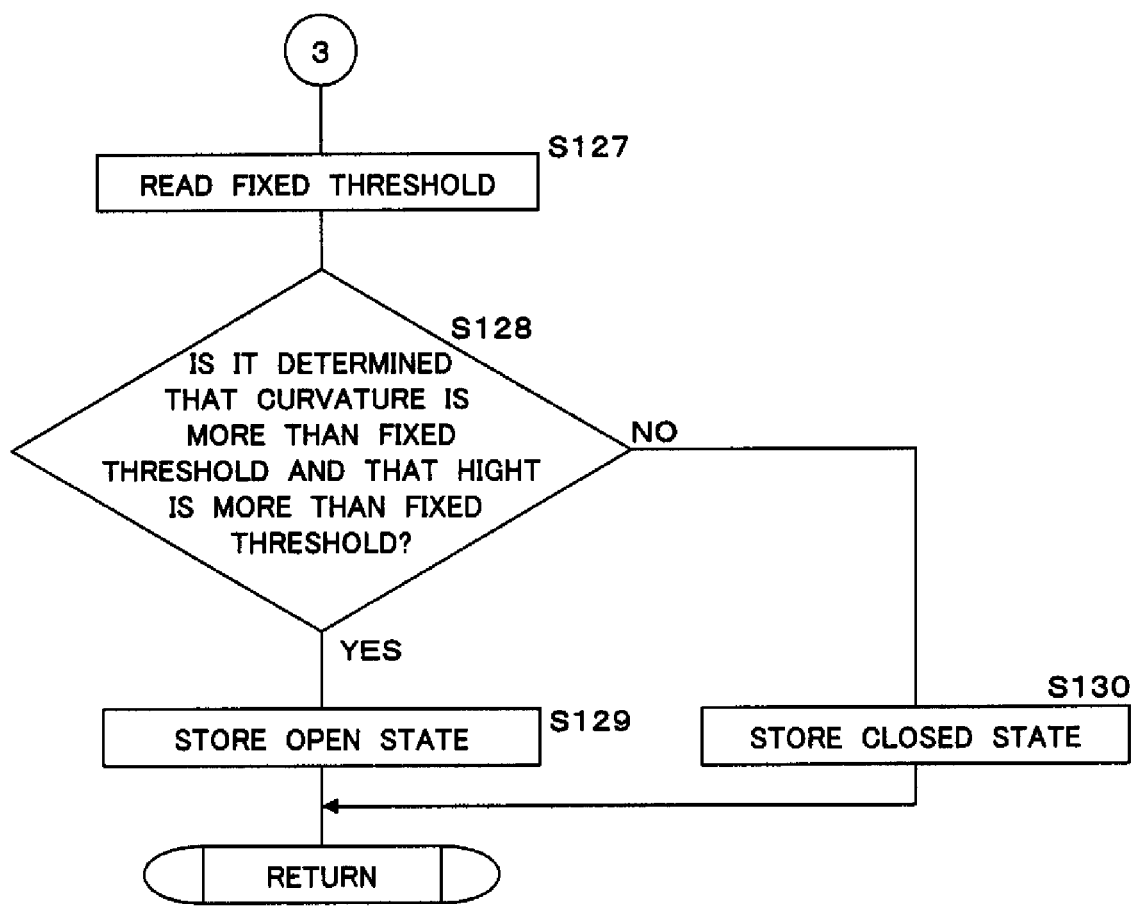
FIG. 17 is an operation chart illustrating a processing procedure of the CPU, concerning the open/closed state determination.

FIGS. 15 to 17 are flow charts each illustrating a processing procedure of the CPU 21, concerning an eye open/closed state determination.

The CPU 21 determines whether the face orientation calculated in Step S14 belongs to the first section (Step S111). When the face orientation has been determined as belonging to the first section (when the answer is YES in Step S111), the CPU 21 reads the feature amounts or in particular the eye curvature and height stored in the feature amount database associated with the face orientation in the present frame (Step S112).

When the face orientation has been determined as not belonging to any first section (when the answer is NO in Step S111), the CPU 21 reads the curvatures and heights stored in the feature amount databases associated with the first sections adjacent to the second section (Step S113).

When the process of Step S112 or Step S113 has been ended, the CPU 21 determines whether the number of the read curvatures or the like is equal to or greater than a given number (Step S114). When the number of the read curvatures or the like is equal to or greater than the given number (when the answer is YES in Step S114), the CPU 21 calculates, on the basis of a plurality of the read curvatures and heights, the average value and dispersion value of the curvatures and heights (Step S115). Then, the CPU 21 normalizes the curvatures and heights calculated in Step S112 or Step S113 by the average value and dispersion value calculated in Step S115, and calculates, on the basis of the normalized values, a standard measure concerning the opening (Step S116). For example, the standard measure of the opening is calculated using the average value or the like of the standard measure of the curvature and that of the eye height.

The average value and dispersion of the opening are varied depending on differences among individuals and face orientations, but the normalization of the opening may obtain the standard measure with the average value and dispersion value kept constant irrespective of differences among individuals and face orientations. Accordingly, threshold values are standardized, and standardized threshold value determination is enabled.

Subsequently, the CPU 21 determines whether the standard measure is greater than a threshold value (Step S117). When the standard measure has been determined to be greater than the threshold value (when the answer is YES in Step S117), the CPU 21 stores the determination that the eye is in an open state, thus ending the process concerning open/closed state determination. When the standard measure has been determined to be equal to or less than the threshold value (when the answer is NO in Step S117), the CPU 21 stores the determination that the eye is in a closed state (Step S119), thus ending the process concerning open/closed state determination.

When the number of the read curvatures or the like has been determined to be less than the given number (when the answer is NO in Step S114), the CPU 21 reads curvatures and heights from the feature amount databases associated with other adjacent first sections (Step S120). Then, the CPU 21 determines whether the number of the read curvatures or the like is equal to or greater than a given number (Step S121).

When the number of the read curvatures or the like has been determined to be equal to or greater than the given number (when the answer is YES in Step S121), the CPU 21 estimates a threshold value for identifying the eye open/closed state on the basis of the read curvatures and heights (Step S122).

Figure 18A:
FIG. 18A, FIG. 18B, FIG. 18C and FIG. 18D are diagrams illustrating an example of a threshold value estimation method.
Figure 18B:

FIG. 18A illustrates an eye shape in a frontally facing state.
FIG. 18B illustrates an eye shape in an upwardly facing state.

The eye shape tends to have a greater curvature and a greater eye height as compared with the frontally facing eye shape.

Figure 18C:
Figure 18D:

FIG. 18C illustrates a leftwardly facing eye shape, and FIG. 18D illustrates a downwardly facing eye shape. The eye shapes each tend to have a smaller curvature and a lower eye height as compared with the frontally facing eye shape.

The HD 23 stores the comparative size relationship of eye openings responsive to face orientations in the HD 23, and on the basis of the curvatures and heights accumulated in the feature amount database associated with the frontal orientation and on the comparative size relationship, the CPU 21 calculates estimated threshold values for determining the eye open/closed state for other face orientations.

Subsequently, the CPU 21 determines whether the eye curvature and eye height calculated in the present frame are greater than the estimated threshold values (Step S123). When the eye curvature and height have been determined to be greater than the respective estimated threshold values (when the answer is YES in Step S123), the CPU 21 stores the determination that the eye is in an open state (Step S124), thus ending the process concerning open/closed state determination. When the eye curvature and height are equal to or less than the estimated threshold values (when the answer is NO in Step S123), the CPU 21 stores the determination that the eye is in a closed state (Step S125), thus ending the process concerning open/closed state determination.

When the number of the curvatures or the like has been determined to be less than the given number in Step S121 (when the answer is NO in Step S121), the CPU 21 determines whether there is any other first section for which curvatures and heights are accumulated (Step S126). When it is determined that there is other first section (when the answer is YES in Step S126), the CPU 21 returns the process to Step S120.

When it is determined that there is no other first section (when the answer is NO in Step S126), the CPU 21 reads, from the HD 23, fixed threshold values concerning eye curvature and height (Step S127).

Then, the CPU 21 determines whether the eye curvature and eye height calculated in the present frame are greater than the fixed threshold values (Step S128). When the eye curvature and height have been determined to be greater than the respective fixed threshold values (when the answer is YES in Step S128), the CPU 21 stores the determination that the eye is in an open state (Step S129), thus ending the process concerning open/closed state determination. When the eye curvature and height are equal to or less than the fixed threshold values (when the answer is NO in Step S128), the CPU 21 stores the determination that the eye is in a closed state (Step S130), thus ending the process concerning open/closed state determination.

In the image processing method, image processing apparatus, image processing system and computer program according to the embodiment, the following aspects are adopted. One aspect includes preparing feature amount databases associated with respective face orientations. One aspect includes accumulating previously calculated feature amounts in such a manner that they are associated with face orientations. One aspect includes normalizing, on the basis of the accumulated feature amounts, a feature amount in the present frame and comparing the feature amount with a threshold value. According to the aspects, it is preferable that a facial part is accurately recognized irrespective of differences among individuals and face orientations. In particular, it is preferable that an eye position and an eye open/closed state are accurately recognized irrespective of differences among individuals and face orientations.

Further, since the embodiment is implemented so that a standard measure is calculated by calculating an average value, dispersion and the like on the basis of feature amounts accumulated in feature amount databases, the accuracy of recognizing a facial part is preferably improved by general arithmetic processing without the use of any special device, e.g., a custom LSI.

Furthermore, the embodiment is implemented so that even if feature amounts are not sufficiently accumulated immediately after the start of facial part recognition, a threshold value is estimated using the feature amounts accumulated for other face orientations, and therefore, false recognition of a facial part is preferably avoided. A facial part is preferably recognized accurately.

Moreover, since feature amount databases are managed by dividing face orientations into first sections and second sections, facial part recognition criteria, e.g., threshold values, preferably avoid face orientation-induced abrupt changes. The facial part recognition accuracy is preferably improved.

It should be noted that in the embodiment, a feature amount is normalized and threshold value processing is executed on the basis of feature amounts accumulated in feature amount databases; alternatively, the embodiment may be implemented so that a threshold value is increased or decreased on the basis of feature amount average value and dispersion value. For example, the embodiment may be implemented so that a threshold value is multiplied by a standard deviation and an average value is added, thereby increasing or decreasing the threshold value. Also when a threshold value is increased or decreased in this manner, effects similar to those of the embodiment are achieved.

Further, although the embodiment is implemented so that feature amounts are accumulated with face orientations divided into 5×9, this face orientation dividing method is just one example, and the number of divisions may be increased or decreased as necessary.

Furthermore, the embodiment may be implemented so that the number of divisions of face orientations may be varied for each facial part feature amount. For example, the embodiment may be implemented so that feature amount databases for accumulating upper eyelid curvatures are each associated with face orientations divided into 9×9, and feature amount databases for accumulating other feature amounts are each associated with face orientations divided into 5×9. It is to be noted that, with the aim of preventing information for coping with differences among individuals and face orientations from being abruptly changed depending on the face orientations, it is necessary to accumulate sufficient feature amounts in feature amount databases.

Moreover, there are provided the first sections for which feature amounts are accumulated, and the second sections for which no feature amount is accumulated; however, when it is necessary to accurately set a threshold value, the embodiment may be implemented so that feature amount databases are associated with all sections.

In the aspects of the embodiment, with the aim of recognizing a facial part, feature amounts of a facial part is calculated on the basis of image data, and the calculated feature amounts are compared with a threshold value, thereby recognizing the facial part.

However, since features such as shape and size of a facial part are varied depending on differences among individuals and face orientations, the facial part cannot be accurately recognized using a fixed threshold value. Therefore, the storage stores the feature amounts, each calculated from the image data obtained in chronological order, in such a manner that the feature amounts are associated with face orientations. The feature amounts stored by the storage serve as information used to cope with changes in feature amounts, resulting from differences among individuals and face orientations.

The facial part recognition part not only makes reference to the feature amount calculated from the other image data and the threshold value, but also makes reference to information indicative of feature changes of the facial part responsive to differences among individuals and face orientations, i.e., a plurality of the stored feature amounts associated with the face orientation in the other image data, thus recognizing the facial part.

Accordingly, even if features of a facial part are varied due to differences among individuals and face orientations, the facial part is preferably recognized accurately in a manner that is not dependent on a face orientation change.

It should be noted that feature amount calculation may be executed either before or after face orientation calculation. Further, the face orientation in other image data does not necessarily have to be a face orientation calculated directly from the other image data; alternatively, a face orientation calculated from past image data, e.g., image data of the immediately preceding frame, may be utilized.

In the aspects of the embodiment, the image processing apparatus calculates feature amount average value and dispersion value on the basis of a plurality of the stored feature amounts associated with the face orientation in the other image data. Further, the image processing apparatus normalizes, on the basis of the calculated average value and dispersion value, the feature amount calculated from the other image data. Feature amount changes resulting from differences among individuals and face orientations are preferably absorbed by normalizing the feature amount. The facial part recognition part compares the normalized feature amount with the threshold value, thereby recognizing the facial part.

Since the above-described process is realized by general arithmetic processing, high-speed processing is preferably realized without the use of any special device, e.g., a custom LSI.

In the aspects of the embodiment, the determination part determines whether the number of the stored feature amounts associated with the face orientation in the other image data is equal to or greater than a given number. When the number of the stored feature amounts is less than the given number, the feature amounts are not sufficient as information used to cope with feature changes resulting from differences among individuals and face orientations.

Therefore, the facial part recognition part recognizes the facial part on the basis of the feature amounts associated with the other face orientation, the feature amount calculated from the other image data, and the threshold value.

Accordingly, it is preferable to avoid false recognition of the facial part performed on the basis of inaccurate information.

In the aspects of the embodiment, the storage divides face orientations into: a plurality of first sections separated in a given direction; and second sections that complement the first sections, and stores, when the face orientation calculated from image data belongs to the first section, feature amounts calculated from the image data in such a manner that the feature amounts are associated with the first section.

Furthermore, the storage stores, when the face orientation calculated from image data belongs to the second section, feature amounts in such a manner that the feature amounts are associated with a plurality of the first sections adjacent to the second section. It is preferable that the feature amounts of the face orientation belonging to the second section are stored so as to be associated with the adjacent first sections, thereby allowing information used for facial part recognition to avoid abrupt changes between the adjacent sections.

Accordingly, facial part recognition criteria preferably avoid face orientation-induced abrupt changes, and more accurate facial part recognition, which is not dependent on a face orientation change, is preferable.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. An image processing method for calculating feature amounts of a facial part in a face on the basis of plural image data obtained in chronological order by capturing an object, comparing the calculated feature amounts with a threshold value, and recognizing the facial part, the method comprising:
calculating face orientations on the basis of image data among the plural image data;
storing, in a storage, the feature amounts calculated from the image data, the feature amounts being associated with the face orientations;
recognizing whether or not different image data of the face other than the plurality of the image data shows that a shape of a facial part on the object is actually changed, on the basis of a feature amount calculated from the different image data, the feature amounts stored in the storage associated with the face orientation in the different image data, and a threshold; and
determining whether the number of the stored feature amounts associated with the face orientation is equal to or greater than a given number,
wherein the recognizing includes:
recognizing the facial part in the different image data when the number of the stored feature amounts associated with the face orientation in the different image data has been determined to be equal to or greater than the given number, the facial part being recognized on the basis of the feature amount calculated from the different image data, the stored calculation result associated with the face orientations, and the threshold; and
recognizing the facial part when the determining has determined that the number of the stored feature amounts is less than the given number, the facial part being recognized on the basis of the feature amount calculated from the different image data, the stored feature amounts associated with another face orientation different from the face orientation, and the threshold.

2. An image processing apparatus for calculating feature amounts of a facial part in a face on the basis of plural image data obtained in chronological order by capturing an object, comparing the calculated feature amounts with a threshold value, and recognizing the facial part, the apparatus comprising:
a calculation part calculating face orientations on the basis of image data among the plural image data;
a storage storing the feature amounts calculated from the image data, the feature amounts being associated with the face orientations;
a facial part recognition part recognizing whether or not different image data of the face other than the plurality of the image data shows that a shape of a facial part on the object is actually changed, on the basis of a feature amount calculated from the different image data, the feature amounts stored in the storage associated with the face orientation in the different image data, and a threshold, and a determination part determining whether the number of the stored feature amounts associated with the face orientation is equal to or greater than a given number, wherein the facial part recognition part includes:
- a part recognizing the facial part in the different image data when the number of the stored feature amounts associated with the face orientation in the different image data has been determined to be equal to or greater than the given number, the facial part being recognized on the basis of the feature amount calculated from the different image data, the stored calculation result associated with the face orientations, and the threshold; and
- a part recognizing the facial part when the determination part has determined that the number of the stored feature amounts is less than the given number, the facial part being recognized on the basis of the feature amount calculated from the different image data, the stored feature amounts associated with another face orientation different from the face orientation, and the threshold.

3. The image processing apparatus according to claim 2, the apparatus further comprising:
- a part calculating feature amount average and variance on the basis of the stored feature amounts associated with the face orientation in the different image data; and
- a part normalizing, on the basis of the calculated average and variance, the feature amount calculated from the different image data, wherein the facial part recognition part is configured so as to compare the normalized feature amount with the threshold, thereby recognizing the facial part.

4. The image processing apparatus according to claim 3, the apparatus further comprising a determination part determining whether the number of the stored feature amounts associated with the face orientation is equal to or greater than a given number, wherein the facial part recognition part includes:
- a part recognizing the facial part in the different image data when the number of the stored feature amounts associated with the face orientation in the different image data has been determined to be equal to or greater than the given number, the facial part being recognized on the basis of the feature amount calculated from the different image data, the stored calculation result associated with the face orientations, and the threshold; and
- a part recognizing the facial part when the determination part has determined that the number of the stored feature amounts is less than the given number, the facial part being recognized on the basis of the feature amount calculated from the different image data, the stored feature amounts associated with another face orientation different from the face orientation, and the threshold.

5. The image processing apparatus according to claim 2, wherein the storage divides the face orientations into:
- a plurality of first sections separated in a given direction; and
- second sections that complement the first sections, and comprises a part storing, wherein the storage stores, when the face orientation calculated from image data belongs to the first section, feature amounts calculated from the image data in such a manner that the feature amounts are associated with the first section, wherein the storage stores, when the face orientation belongs to the second section, feature amounts in such a manner that the feature amounts are associated with a plurality of the first sections adjacent to the second section, wherein the facial part recognition part is configured so as to recognize, when the face orientation in the different image data belongs to the first section, a facial part on the basis of the stored feature amounts associated with the first section, and wherein the facial part recognition part is configured so as to recognize, when the face orientation in the different image data belongs to the second section, a facial part on the basis of the stored feature amounts associated with a plurality of the first sections adjacent to the second section.

6. The image processing apparatus according to claim 2, wherein the feature amount is a correlation value between a template image for detecting an eye and the image data, an inside/outside brightness difference of an eye, or an opening of an eye.

7. An image processing system comprising:
- the image processing apparatus according to claim 2; and
- an image pickup device for taking an image of a driver of a vehicle, wherein the image processing apparatus is configured so as to recognize a facial part on the basis of image data of a face of the driver whose image has been taken by the image pickup device.

8. A non-transitory computer-readable recording medium which stores a computer-executable program for causing a computer, which is connected to a storage, to calculate feature amounts of a facial part in a face on the basis of plural image data obtained in chronological order by capturing an object, to compare the calculated feature amounts with a threshold value, and to recognize the facial part, the program comprising instructions of causing the computer to execute:
- calculating face orientations on the basis of the plurality of pieces of image data among the plural image data;
- storing, in the storage, the feature amounts calculated from the image data, the feature amounts being associated with the face orientations; and
- recognizing whether or not different image data of the face other than the plurality of the image data shows that a shape of a facial part on the object is actually changed, on the basis of a feature amount calculated from the different image data, the feature amounts stored in the storage associated with the face orientation in the different image data, and a threshold, and
- determining whether the number of the stored feature amounts associated with the face orientation is equal to or greater than a given number, wherein the recognizing includes:
- recognizing the facial part in the different image data when the number of the stored feature amounts associated with the face orientation in the different image data has been determined to be equal to or greater than the given number, the facial part being recognized on the basis of the feature amount calculated from the different image data, the stored calculation result associated with the face orientations, and the threshold; and
- recognizing the facial part when the determining has determined that the number of the stored feature amounts is less than the given number, the facial part being recognized on the basis of the feature amount calculated from the different image data, the stored feature amounts associated with another face orientation different from the face orientation, and the threshold.

9. An image processing apparatus for calculating feature amounts of a facial part in a face on the basis of plural image data obtained in chronological order by capturing an object, comparing the calculated feature amounts with a threshold value, and recognizing the facial part, the apparatus comprising:
- a calculation means for calculating face orientations on the basis of image data among the plural image data;
- a storage for storing the feature amounts calculated from the image data, the feature amounts being associated with the face orientations;
- a facial part recognition means for recognizing whether or not different image data of the face other than the plurality of the image data shows that a shape of a facial part on the object is actually changed, on the basis of a feature amount calculated from the different image data, the feature amounts stored in the storage associated with the face orientation in the different mage data, and a threshold; and
- a determination means for determining whether the number of the stored feature amounts associated with the face orientation is equal to or greater than a given number, wherein the facial part recognition means includes:
- means for recognizing the facial part in the different image data when the number of the stored feature amounts associated with the face orientation in the different image data has been determined to be equal to or greater than the given number, the facial part being recognized on the basis of the feature amount calculated from the different image data, the stored calculation result associated with the face orientations, and the threshold; and
- means for recognizing the facial part when the determination means has determined that the number of the stored feature amounts is less than the given number, the facial part being recognized on the basis of the feature amount calculated from the different image data, the stored feature amounts associated with another face orientation different from the face orientation, and the threshold.

* * * * *